United States Patent
Guntar et al.

(10) Patent No.: US 12,307,361 B2
(45) Date of Patent: May 20, 2025

(54) DETECTING THREATS BASED ON API SERVICE BUSINESS LOGIC ABUSE

(71) Applicant: Traceable Inc., San Francisco, CA (US)

(72) Inventors: Ravindra Guntar, Hyderabad (IN); Ranaji Krishna, Berkeley, CA (US)

(73) Assignee: Traceable Inc, San Francisco, CA (US)

( * ) Notice: Subject to any disclaimer, the term of this patent is extended or adjusted under 35 U.S.C. 154(b) by 521 days.

(21) Appl. No.: 17/349,942

(22) Filed: Jun. 17, 2021

(65) Prior Publication Data

US 2022/0318378 A1 Oct. 6, 2022

Related U.S. Application Data

(60) Provisional application No. 63/167,649, filed on Mar. 30, 2021.

(51) Int. Cl.
  *G06N 3/08* (2023.01)
  *G06F 9/54* (2006.01)
  (Continued)

(52) U.S. Cl.
  CPC .............. *G06N 3/08* (2013.01); *G06F 9/541* (2013.01); *G06F 9/543* (2013.01); *G06F 9/547* (2013.01);
  (Continued)

(58) Field of Classification Search
  CPC .... G06Q 30/0185; G06N 3/0895; G06N 3/09; G06N 3/091; G06N 3/092; G06N 3/094; G06N 3/096; G06N 3/098; G06N 3/04; G06N 3/0464; G06N 3/0475; G06N 3/0495; G06N 3/0499; G06N 3/08; H04L 67/01; H04L 67/02; H04L 67/025; H04L 67/133; H04L 67/303; H04L 67/306; H04L 9/40;
  (Continued)

(56) References Cited

U.S. PATENT DOCUMENTS

| | | | |
|---|---|---|---|
| 6,226,408 B1* | 5/2001 | Sirosh | G06F 18/2323 382/253 |
| 7,058,633 B1 | 6/2006 | Gnagy et al. | |
| 9,215,212 B2 | 12/2015 | Reddy et al. | |
| 9,516,053 B1* | 12/2016 | Muddu | G06F 3/0484 |

(Continued)

FOREIGN PATENT DOCUMENTS

WO   WO-2017151515 A1 *  9/2017 ............. G06F 21/55

OTHER PUBLICATIONS

Mingxin Wang, A Moving Window Principal Components Analysis Based Anomaly Detection and Mitigation Approach in SDN Network, Aug. 31, 2018, National Laboratory of Next Generation Internet Interconnection Devices, 3951-3962 (Year: 2018).*

*Primary Examiner* — Bassam A Noaman
(74) *Attorney, Agent, or Firm* — Riyon Harding

(57) ABSTRACT

Behaviors in the form of API strings for each of a plurality of users are determined for each user interacting with an API for a particular time. The behavior strings are converted to a numerical format, and clustering algorithms are applied to the numerical format data. The type of cluster is then determined for each cluster. Types of clusters can include an attacking user, bots, speed of access, and outlier type. The results of clustering and a statistical analysis can be reported to a user through a dashboard. The dashboard may provide graphical information, for example in the form of a sankey diagram, as well as statistical analysis data for each cluster.

11 Claims, 13 Drawing Sheets

(51) Int. Cl.
*G06F 16/901* (2019.01)
*G06F 16/955* (2019.01)
*G06F 21/55* (2013.01)
*G06N 3/04* (2023.01)
*H04L 9/40* (2022.01)
*H04L 67/133* (2022.01)

(52) U.S. Cl.
CPC ...... *G06F 16/9027* (2019.01); *G06F 16/9566* (2019.01); *G06F 21/552* (2013.01); *G06N 3/04* (2013.01); *H04L 63/1425* (2013.01); *H04L 67/133* (2022.05); *G06F 2221/034* (2013.01)

(58) Field of Classification Search
CPC ..... H04L 63/1425; G06F 9/541; G06F 9/543; G06F 9/547; G06F 16/9027; G06F 16/9566; G06F 21/552; G06F 2221/034
See application file for complete search history.

(56) References Cited

U.S. PATENT DOCUMENTS

| | | | |
|---|---|---|---|
| 9,667,704 | B1 | 5/2017 | Sonawane |
| 10,747,505 | B1 | 8/2020 | Lester et al. |
| 10,764,041 | B2 * | 9/2020 | Saxena ................... H04L 9/083 |
| 10,873,618 | B1 | 12/2020 | Mittal et al. |
| 10,917,401 | B1 | 2/2021 | Mantin et al. |
| 2007/0250624 | A1 | 10/2007 | Wexler et al. |
| 2008/0034424 | A1 | 2/2008 | Overcash et al. |
| 2008/0184340 | A1 | 7/2008 | Nakamura et al. |
| 2010/0235918 | A1 | 9/2010 | Mizrahi et al. |
| 2010/0325588 | A1 | 12/2010 | Reddy et al. |
| 2011/0145930 | A1 | 6/2011 | Gnech et al. |
| 2015/0180745 | A1 | 6/2015 | Horn et al. |
| 2016/0057107 | A1 | 2/2016 | Call et al. |
| 2016/0099963 | A1 * | 4/2016 | Mahaffey .............. G06F 21/554 726/25 |
| 2018/0196643 | A1 | 7/2018 | Dolby et al. |
| 2020/0286112 | A1 * | 9/2020 | Zhou ...................... G06N 3/084 |
| 2021/0211486 | A1 | 7/2021 | Mittal et al. |

* cited by examiner

DETECTING THREATS BASED ON API SERVICE BUSINESS LOGIC ABUSE

CROSS REFERENCE TO RELATED APPLICATIONS

The present application claims the priority benefit of U.S. provisional patent application 63/167,649, filed on Mar. 30, 2021, titled "INTELLIGENT APPLICATION PROTECTION," the disclosure of which is incorporated herein by reference.

BACKGROUND

Typically, threat detection systems designed to protect a network service detect a threat event at a particular point in time at a particular node in the service. Typically, no context information is given for these detected threats. Though these systems have detected threat events in the past, they provide no information regarding how the attacking user got to that point in the system. What is needed is an improved threat detection system for network services.

SUMMARY

The present system, roughly described, groups users by clustering behaviors that are very similar to each other. A group of users can be tracked in their journey through an API sequence or session using the clusters. The place of attack and how the attacking user got to an attack point, such as a particular API, are identified so that the entire sequence of user actions can be analyzed to strengthen the system that was attacked.

Behaviors in the form of API strings for each of a plurality of users are determined for each user interacting with an API for a particular time. The behavior strings are converted to a numerical format, and clustering algorithms are applied to the numerical format data. The type of cluster is then determined for each cluster. Types of clusters can include an attacking user, bots, speed of access, and outlier type. The results of clustering and a statistical analysis can be reported to a user through a dashboard. The dashboard may provide graphical information, for example in the form of a sankey diagram, as well as statistical analysis data for each cluster.

In some instances, a method automatically detects service attackers based on API service business logic analysis. The method begins with determining a total behavior as a sequence of API activity for a plurality of users accessing a network service over a period of time. A plurality of micro-behavior strings are then determined for each user, wherein each micro-behavior includes a subset of the user's total behavior. Each micro-behavior sting is converted to a numerical format. The method continues with clustering the numerical format behaviors in clusters which match a similarity threshold, wherein each numerical format behavior is associated with a user ID associated with the user that performed the sequence of API activity for the particular behavior. A type of each cluster is determined, and the cluster type is reported.

In some instances, a non-transitory computer readable storage medium has embodied thereon a program that is executable by a processor to perform a method. The method automatically detects service attackers based on API service business logic analysis. The method begins with determining a total behavior as a sequence of API activity for a plurality of users accessing a network service over a period of time. A plurality of micro-behavior strings are then determined for each user, wherein each micro-behavior includes a subset of the user's total behavior. Each micro-behavior sting is converted to a numerical format. The method continues with clustering the numerical format behaviors in clusters which match a similarity threshold, wherein each numerical format behavior is associated with a user ID associated with the user that performed the sequence of API activity for the particular behavior. A type of each cluster is determined, and the cluster type is reported.

In embodiments, a system can include a server, memory and one or more processors. One or more modules may be stored in memory and executed by the processors to determine a total behavior as a sequence of API activity for a plurality of users accessing a network service over a period of time, determine a plurality of micro-behavior strings for each user, wherein each micro-behavior includes a subset of the user's total behavior, convert each micro-behavior sting to a numerical format, cluster the numerical format behaviors in clusters which match a similarity threshold, wherein each numerical format behavior is associated with a user ID associated with the user that performed the sequence of API activity for the particular behavior, determine a type of each cluster, and report the cluster type.

DETAILED DESCRIPTION

The present system, roughly described, groups users by clustering behaviors that are very similar to each other. A group of users can be tracked in their journey through an API sequence or session using the clusters. The place of attack and how the attacking user got to an attack point, such as a particular API, are identified so that the entire sequence of user actions can be analyzed to strengthen the system that was attacked.

Behaviors in the form of API strings for each of a plurality of users are determined for each user interacting with an API for a particular time. The behavior strings are converted to a numerical format, and clustering algorithms are applied to the numerical format data. The type of cluster is then determined for each cluster. Types of clusters can include an attacking user, bots, speed of access, and outlier type. The results of clustering and a statistical analysis can be reported to a user through a dashboard. The dashboard may provide graphical information, for example in the form of a sankey diagram, as well as statistical analysis data for each cluster.

Figure 1:
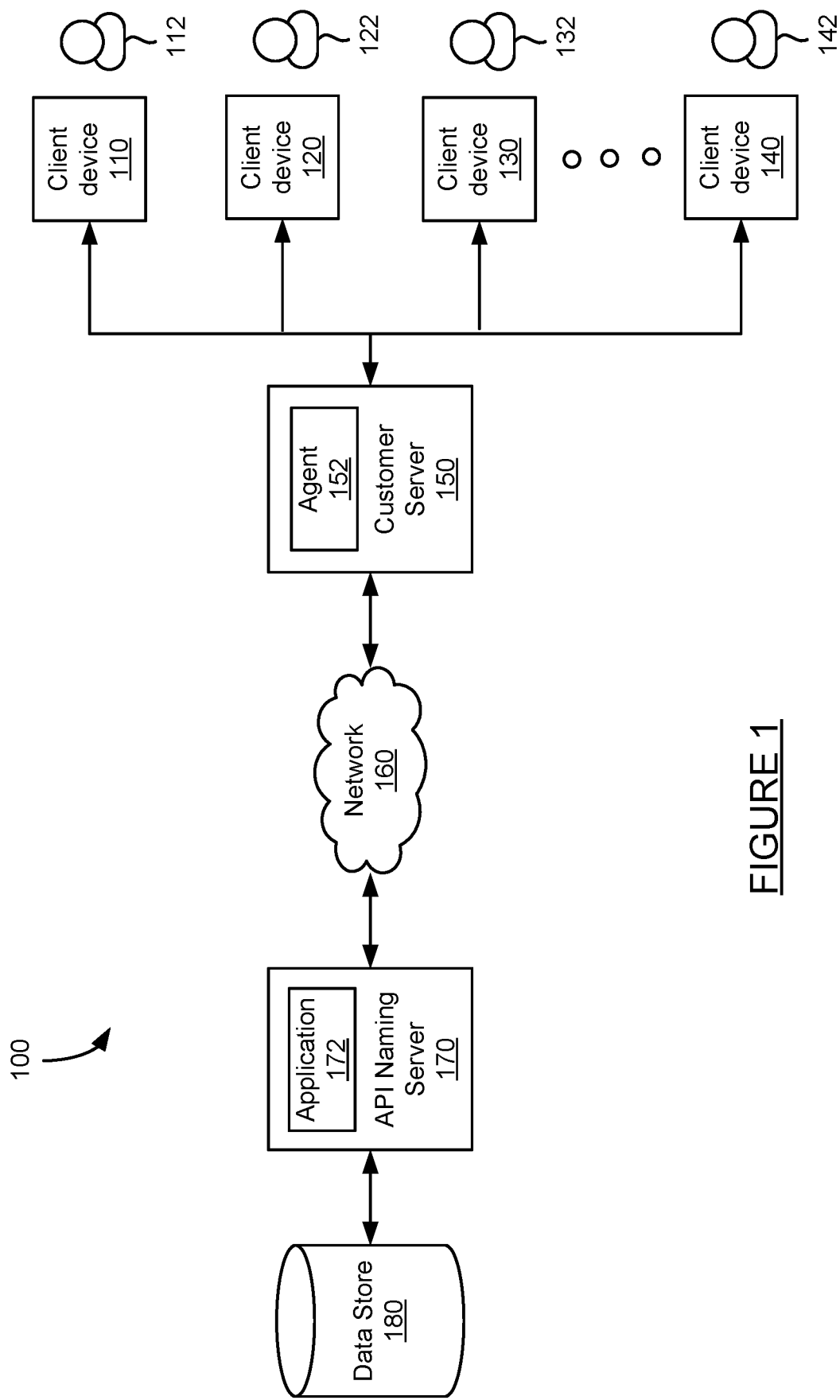
FIG. 1 is a block diagram of a system for detecting business logic abuse based on clusters of user behavior data.

FIG. 1 is a block diagram of a system for detecting business logic abuse based on clusters of user behavior data. The block diagram 100 of FIG. 1 includes client devices 110-140, customer server 150, network 160, Application server 170, and data store 180.

Client devices 110-140 may send API requests to and receive API responses from customer server 150. The client devices may be any device which can access the service, network page, webpage, or other content provided by customer server 150. Client devices 110-140 may send a request to customer server 150, for example to an API provided by customer server 150, and customer server 150 may send a response to the devices based on the request. The request may be sent to a particular URL provided by customer server 150 and the response may be sent from the server to the device in response to the request. Though only for four client devices are shown, a typical system may handle requests from a larger number of clients, for example, dozens, hundreds, or thousands, and any number of client devices may be used to interact with customer server 150.

Customer server 150 may provide a service to client devices 110-140. The service may be accessible through APIs provided by customer server 150. Agent 152 on customer server 150 may monitor the communication between customer server 150 and client devices 110-140 and intercept traffic transmitted between the server and the devices. Upon intercepting the traffic, agent 152 may forward the traffic to application 172 on application server 170. In some instances, one or more agents may be installed on customer server 150, which may be implemented by one or more physical or logical machines. In some instances, server 150 may actually be implemented by multiple servers in different locations, providing a distributed service for devices 110-140. In any case, one or more agents 152 may be installed to intercept API requests and responses between devices 110-140 and customer server 150, in some instances may aggregate the traffic by API request and response data, and may transmit request and response data to application 172 on server 170.

Network 140 may include one or more private networks, public networks, intranets, the Internet, an intranet, wide-area networks, local area networks, cellular networks, radio-frequency networks, Wi-Fi networks, any other network which may be used to transmit data, and any combination of these networks. Client devices 110-140, customer server 150, Application server 170, and data store 180 may all communicate over network 160 (whether or not labeled so in FIG. 1).

Application server 170 may be implemented as one or more physical or logical machines that provide application functionality as described herein. In some instances, application server may include one or more applications 172. The application 172 may be stored on one or more application servers 170 and be executed to perform functionality as described herein. Application server and application 172 may both communicate over network 160 with data store 180. Application 172 is discussed in more detail with respect to FIG. 2.

Data store 180 may be accessible by application server 170 and application 172. In some instance, data store 180 may include one or more APIs, API descriptions, metric data, and other data discussed herein.

Figure 2:
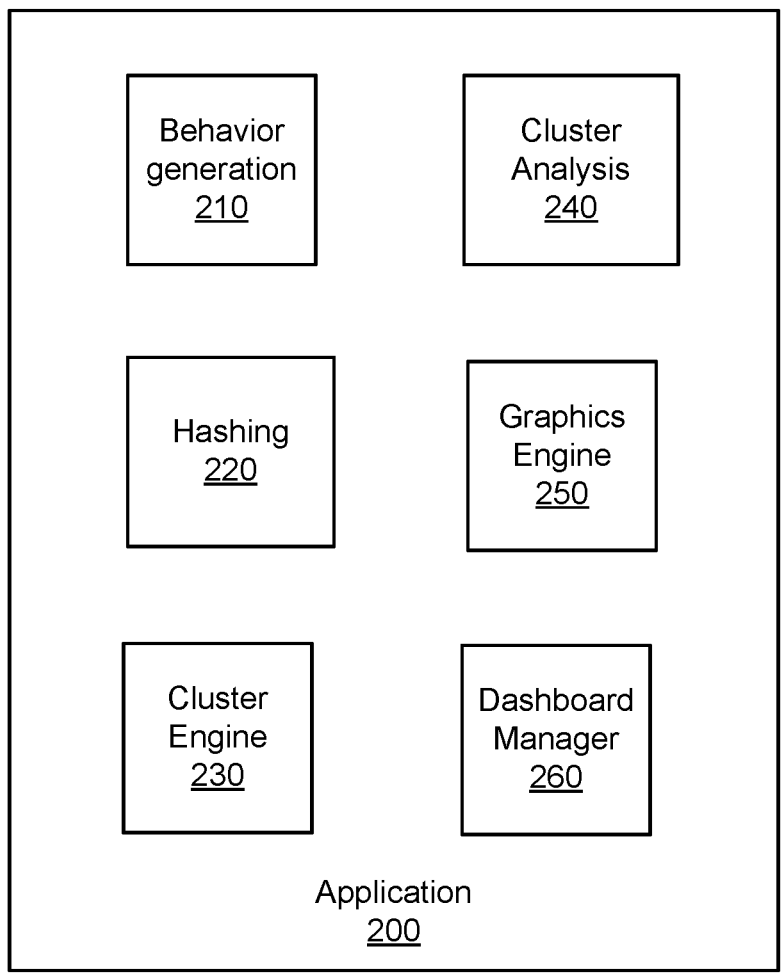
FIG. 2 is a block diagram of an application that automatically detects business logic abuse based on clusters of user behavior data.

FIG. 2 is a block diagram of an application that automatically detects business logic abuse based on clusters of user behavior data. Application 200 of FIG. 2 provides more detail for application 172 of the system of FIG. 1. Application 200 includes behavior generation module 210, hashing module 220, cluster engine 230, cluster analysis module 240, graphics engine 250, and dashboard manager 260. Behavior generation module 210 may determine behaviors for each user interacting with an API for a particular time period. The behavior generation module may generate total behaviors as well as identify micro-behaviors as a subset of the total user behavior for each user. Behavior generation may generate a total behavior from the API activity intercepted and analyzed of least in part by one or more installed agents. Behavior generation module 210 may determine micro-behaviors using a sliding window, identifying micro-behaviors which overlap at least in part. The micro-behaviors may be expressed as an API strings followed by another API string, followed by other API string, and so on for as many API strings that make up the micro behavior. Micro-behaviors may be selected as a set number of APIs, number of APIs that collectively perform a business task, or some other number of APIs.

Hashing module 220 may be used to perform one or more hashes on data as described herein. In some instance, micro behaviors may be converted to numerical vectors using a hash. For example, a minhash technique may be used to convert text strings of APIs to vectors having many dimensions, such as for example 10-20 dimensions.

Cluster engine 230 may be used to generate clusters of vectors. The clusters may include similar vectors and a list of user IDs. The clustering algorithms implemented by cluster engine 230 may transform data into a graph indicating relationships, such as spatial relationships, between nodes for vectors.

A cluster analysis 240 may determine a cluster type for each cluster. Cluster types may include attacking user clusters, bot clusters, speed of access clusters, and outlier clusters. For each identified type, a particular cluster having that type is partitioned into sessions, the matching sessions for the type are removed, and the remainder of session in the cluster will form a new cluster of type "normal."

Graphics engine 250 may provide all or part of the graphics provided to a user through a dashboard. The graphics may include a Sankey diagram as well as other graphics. Graphics engine 250 may provide templates, populate the templates, and generate graphical elements in real time to provide up-to-date dashboards to an administrator.

Dashboard manager 260 may generate and provide a dashboard to a user, for example as a webpage over network. Dashboard manager 260 may coordinate graphics, perform statistical analysis of cluster data, and provide an interface that can be interacted with by a user.

In some instances, more or fewer modules may be implemented in one or more applications to perform the functionality herein. The discussion of the modules with an application 200 is not intended to be limiting. The modules displayed can be combined, distributed, additional, or fewer modules then described, which will collectively perform the functionality described herein.

Figure 3:
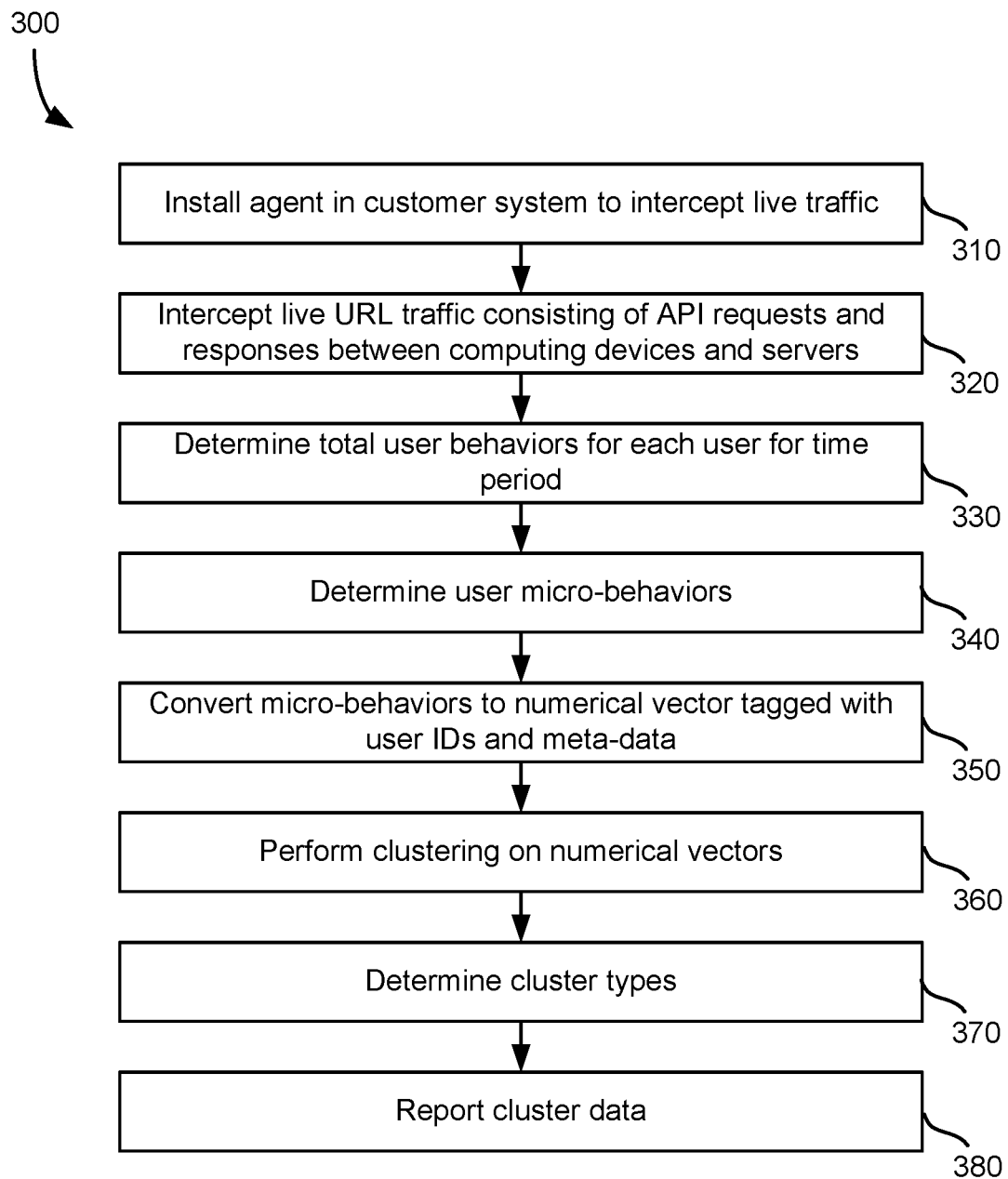
FIG. 3 is a method that automatically detects business logic abuse based on clusters of user behavior data.

FIG. 3 is a method that automatically detects business logic abuse based on clusters of user behavior data. First, agents are installed in a customer system to intercept live traffic at step 310. Live URL traffic consisting of API requests and responses can be intercepted between computing devices and servers by the agent at step 320. The agents may intercept the traffic, aggregate the intercepted traffic data, and send the data from the agent to an application periodically, in response to a push or pull event, or based on some other event. The intercepted data can be used to determine the metrics and information discussed herein. For example, the time a request is received, the sender of the request, and request content can be collected by an agent. The processing of a request, including the response time, content of the response, and the destination of the response, can be intercepted by an agent as well. Relationships between sent responses and subsequent requests can also be intercepted by one or more agents.

Total user behaviors for each user for a particular time period are determined at step 300. The total behavior for a user includes the total API sequence followed by the user while interacting with a network service during a session. A session is a period of time during which the user is performing a task or operation with a network service. For example, a session may involve a user selecting a product, adding the product to a cart, and performing checkout. Micro-behaviors are determined for each user at step 340. The micro behavior may be a subset of the total user behavior for each user. In some instances, a micro behavior may be identified using a sliding window of a set length. When using a sliding window, adjacent micro-behaviors within a total behavior may overlap. For example, a sliding window may identify three APIs as a micro behavior, and the sliding window may slide one API at a time to identify the next micro-behavior, such that consecutive micro-behaviors have two overlapping APIs. In any case, a micro behavior may be implemented as a series of API strings linked together. In the case of a micro behavior of three APIs, micro behavior would be a first API string followed by second API string followed by a third API string.

Micro-behaviors may be converted from a text string to a numerical vector that is tagged with a user ID and metadata at step 350. Converting micro-behaviors to a number format may include performing a technique to transform the text string to a number format such as a vector. Once the number format is generated, the user ID associated with the micro behavior and metadata associated with the micro behavior is attached, linked, or inserted to the number format data or vector. Converting a micro behavior text string to number format data such as a vector is discussed in more detail below with respect to the method of FIG. 4.

Clustering is performed on numerical vectors at step 360. Clustering algorithms are applied to the numerical vectors and tagged with the user IDs. The clusters may include similar vectors (user behaviors) and a list of user identifiers. Clustering may involve performing multiple passes of an algorithm to generate clusters of spatially close or related vectors. More details for a clustering together micro behavior of vectors is discussed with respect to the method of FIG. 5.

Types of clusters are determined at step 370. In some instances, there may be several types of clusters, including an attacking user, bot, speed of access, and outlier clusters. The cluster types may be identified in parallel, or in a specific order. In some instances, an attacking user cluster type is identified first, followed by bots, followed by speed of access, and finally followed by outliers. Methods for determining a type of cluster are discussed with respect to FIGS. 7-10.

Cluster data is reported at step 380. Reporting of the cluster data may be performed through a dashboard, which may provide graphical data, statistical analysis data, and other data. A method for providing a dashboard is discussed with respect to the method of FIG. 11.

Figure 4:
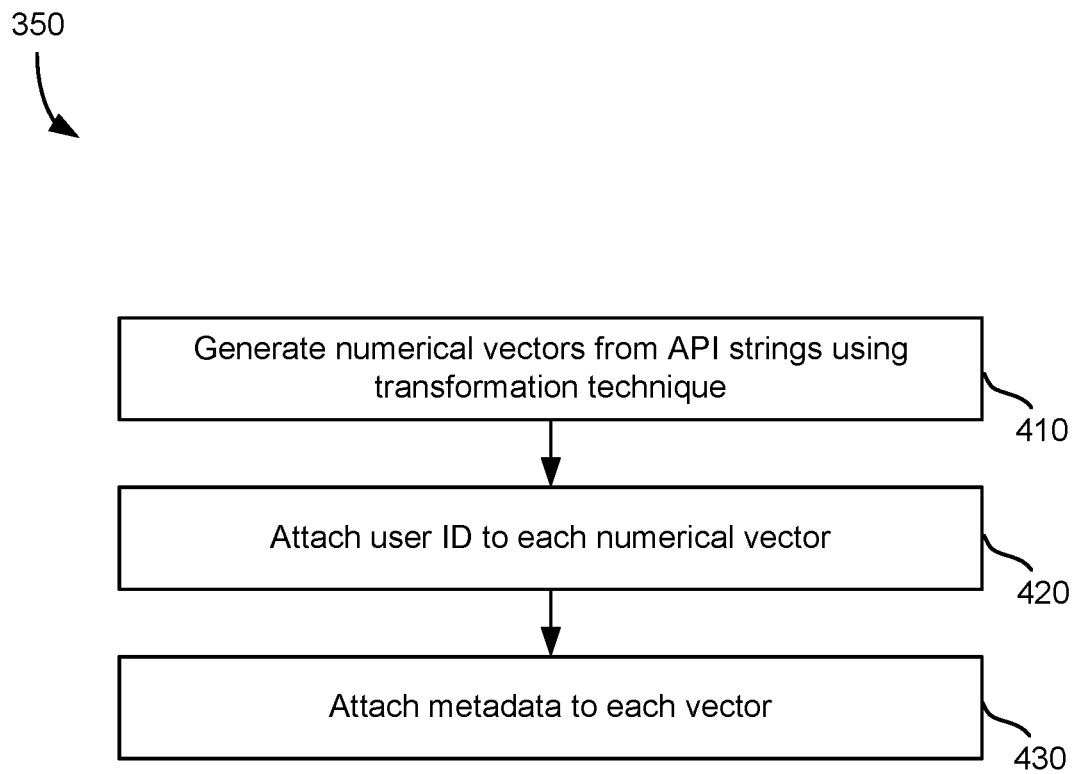
FIG. 4 is a method for converting micro-behavior strings into a numerical format.

FIG. 4 is a method for converting micro-behavior strings into a numerical format. The method of FIG. 4 provides more detail for step 350 of the method of FIG. 3. First, numerical vectors are generated from API strings using a transformation technique at step 410. In some instances, a hash may be used to convert the text strings to a numerical vector. The hash technique can include, for instance, a minhash. In some instances, the generated vectors may have multiple dimensions, such as for example between 10-20 dimensions.

A user ID is attached to each numerical vector at step 420. The user ID is the ID associated with the micro behavior determined at step 340 of the method of FIG. 3. Metadata is also attached to each vector at step 430. Different types of metadata may be attached to each vector, based on design preferences. In some instances, the metadata may include the session in which the vector occurred, an IP address associated with the particular API, and the API name.

Figure 5:
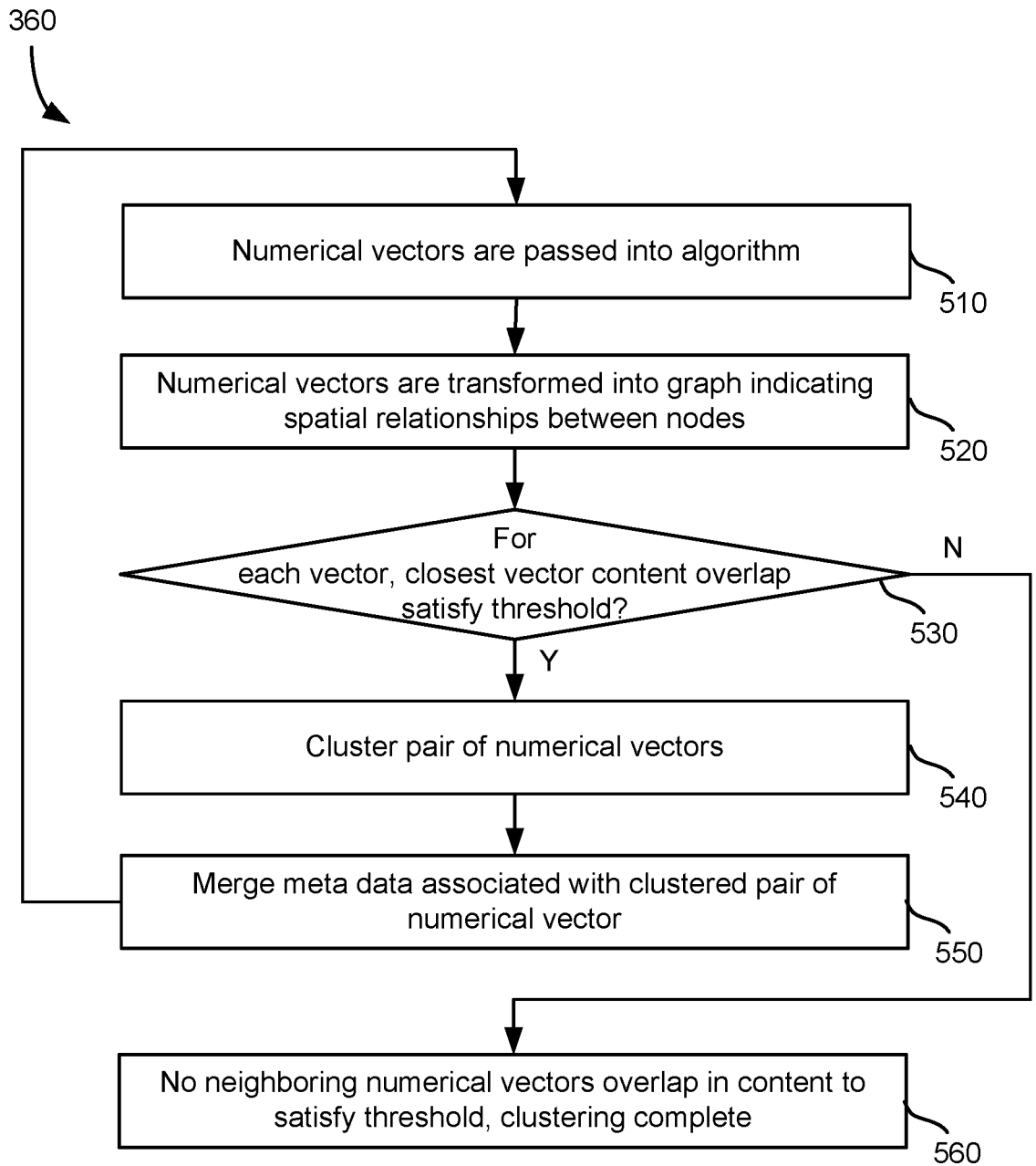
FIG. 5 is a method for clustering numerical vectors.

FIG. 5 is a method for clustering numerical vectors. The method of FIG. 5 provides more detail of step 360 of the method of FIG. 3. Numerical vectors are passed into a clustering algorithm at step 510. In some instances, the clustering algorithm may be implemented by a locality sensitive hashing algorithm, or LSH algorithm. Numerical vectors are transformed into a graphical format indicating the spatial relationships between the nodes at step 520.

A determination is made, for each vector, whether the closest vector content overlap satisfies a threshold at step 530. In some instances, an analysis is performed to see if a vector and a neighboring vector have overlapping content. If the overlapping content satisfies a threshold, such as for example 60% overlap between the vectors, then the pair of numerical vectors can be clustered at step 540. Clustering numerical vectors may include merging the values of each vector, such that each value appears once. For example, if vector A included values of [1, 2, 3] and a vector B includes values of [1, 2, 5], the clustering algorithm would determine an overlap of [1,2], which is over 60% of the content of each vector, and would cluster the vectors into a single cluster vector of [1, 2, 3, 5]. If no vector content within the entire cluster satisfies the overlap threshold, then no neighboring numerical vectors overlap their content to satisfy the threshold and the clustering is complete at step 560.

If there are two vectors having content that overlap enough to satisfy the threshold that step 530, the pair of numerical vectors is clustered at step 540. Metadata associated with the clustered pair of numerical vectors is then merged at step 550. Merging the metadata may involve different techniques for different types of metadata. For example, some metadata may be merged into a list, a graph, by a summation, when some other manner. Information for merging metadata for new clusters is discussed with respect to the method of FIG. 6.

After merging the metadata, the method of FIG. 5 returns to step 510. Once the algorithm has compared all pairs of vectors to determine if there is any vector content overlap that satisfies a threshold, and no pair of vectors satisfy the threshold, then the method of FIG. 5 ends at step 560.

Figure 6:
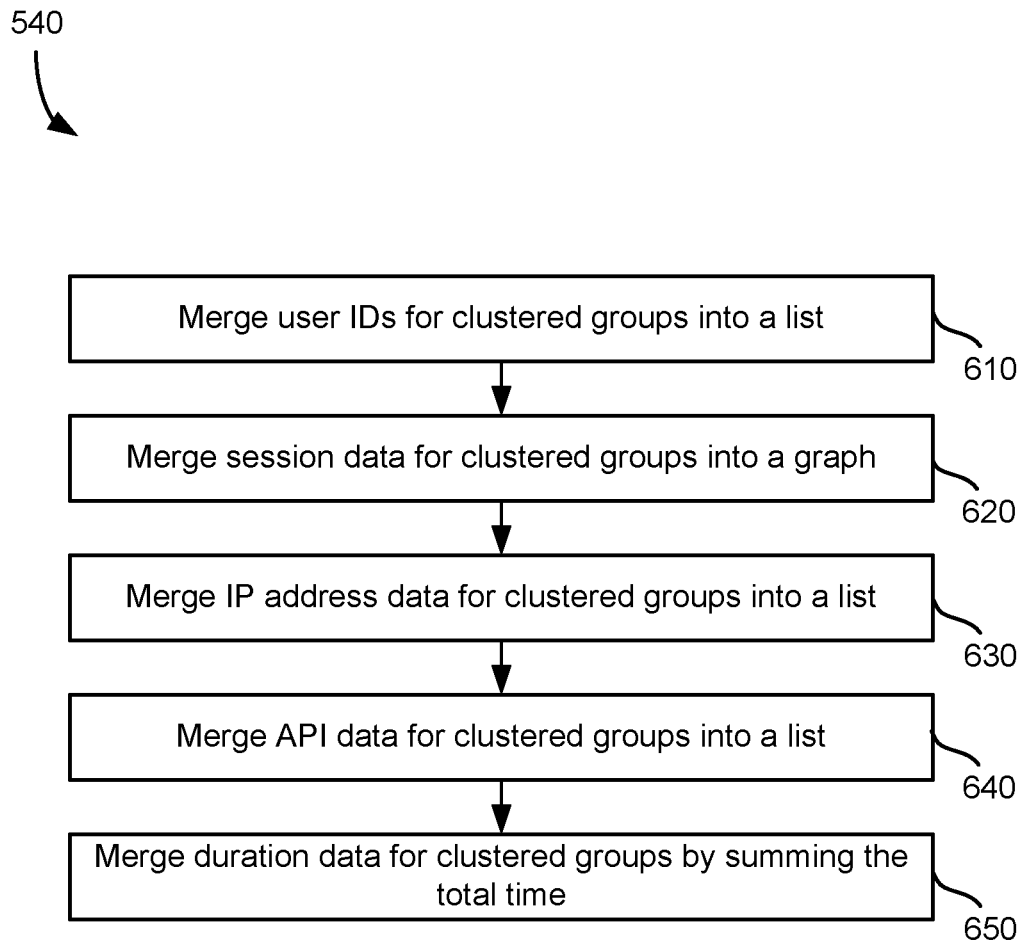
FIG. 6 is a method for merging meta data for new clusters.

FIG. 6 is a method for merging meta data for new clusters. The method of FIG. 6 provides more detail for step 540 of the method of FIG. 5. User IDs for clustered groups are merged into a list at step 620. Hence, the user IDs for each cluster are added into a single list of user IDs. Session data for a clustered group is merged into a graph at step 620. IP address data for the cluster groups is merged into a list at step 630. API data is also merged into a list at step 640.

Duration data for the clustered groups is merged by adding the time together to form a single duration.

There are several types of clusters that can be identified. Examples of cluster types include an attacking user, bot, speed of access, and outlier types. Each of FIGS. 7-10 relate to a method for identifying a cluster type.

Figure 7:
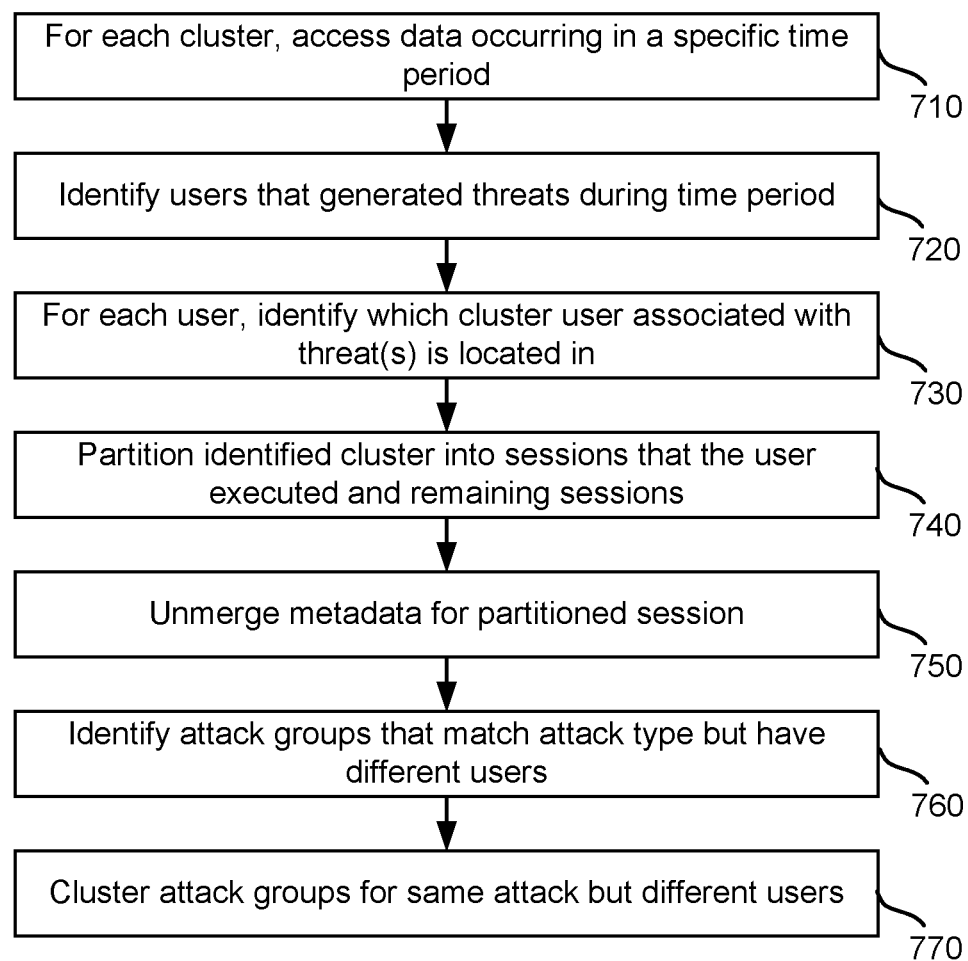
FIG. 7 is a method for identifying an attacking user cluster type.

FIG. 7 is a method for identifying an attacking user cluster type. The method of FIG. 7 provides more detail for step 370 of the method of FIG. 3. First, for each cluster, data is accessed that occurs in a specific time period at step 710. Users are identified that generated threats during the time period at step 720. The service identifies user IDs and threats generated per user ID for the particular time. For each identified user, the clusters in which the user was associated with, where the threats occurred, are identified at step 730. Hence, the cluster the user associated with the threat is in is identified.

The identified clusters are partitioned into the sessions that the user executed and the remaining sessions at step 740. Hence, one partition is made for each user attack, and the remainder of the cluster is partitioned into a normal cluster. Metadata for the partition sessions is unmerged at step 750. Unmerging the metadata may be performed in the same manner that the metadata was merged for the particular cluster. Attack groups that match the attack type but have different users are identified at step 760. The attack groups for the same attack but with different users are then clustered into a single cluster at step 770.

Figure 8:
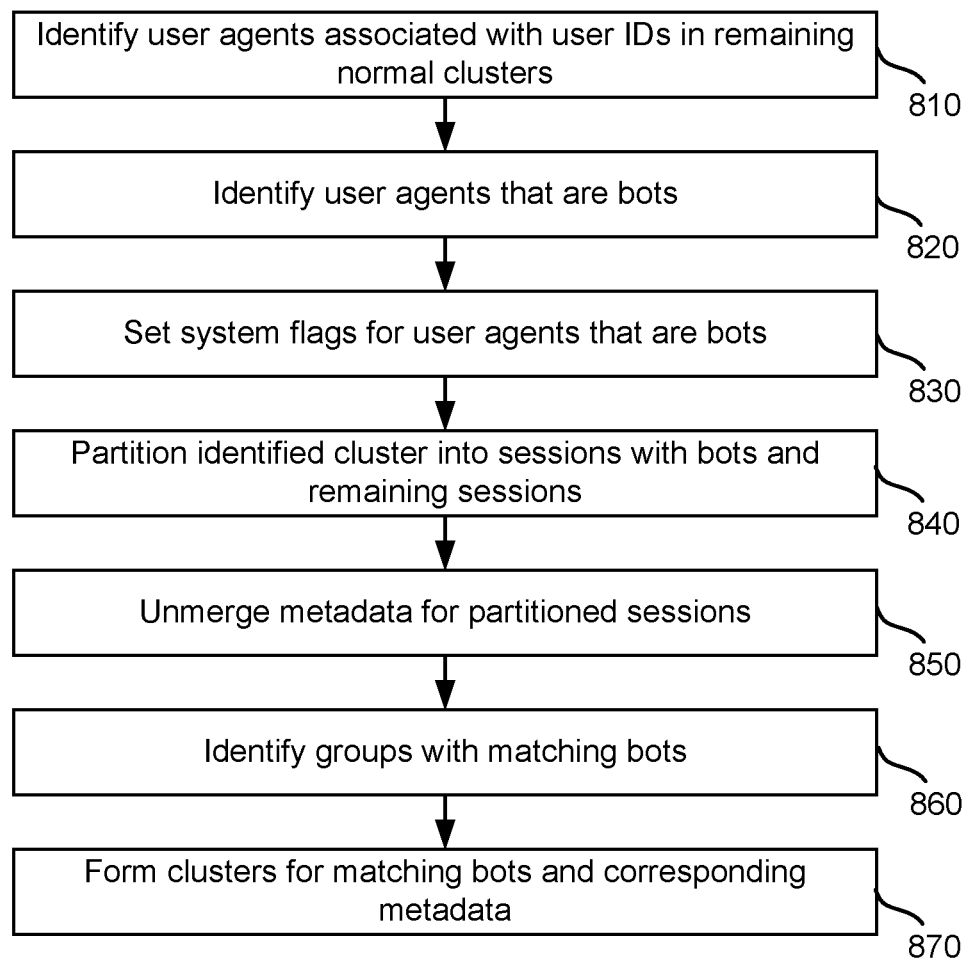
FIG. 8 is a method for identifying a bot cluster type.

FIG. 8 is a method for identifying a bot cluster type. The method of FIG. 8 provides more detail of step 370 of the method of FIG. 3. First, user agents associated with user IDs in the remaining normal clusters are identified at step 810. User agents that are bots are then identified at step 820. Examples of bots include a Googlebot or bingbot. System flags are set for user agents implemented by bots at step 830. The identified cluster is then partitioned into sessions with bots and the remaining sessions at step 840. Remaining sessions are clustered into a cluster having a type of normal. Metadata for the partition sessions is unmerged at step 850, and groups with matching bots are identified at step 860. Clusters are formed for the matching bots and corresponding metadata at step 870.

Figure 9:
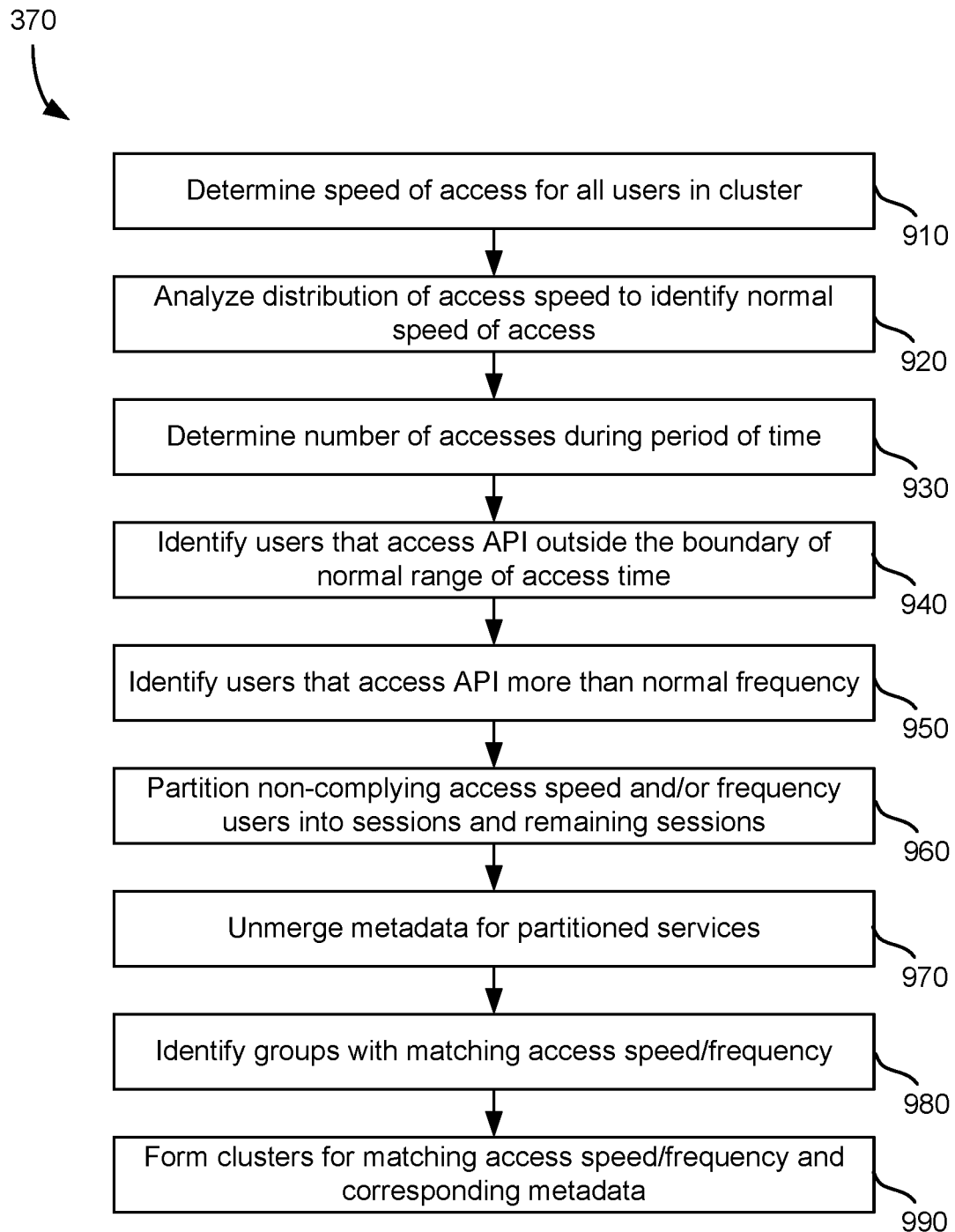
FIG. 9 is a method for identifying a speed of access cluster type.

FIG. 9 is a method for identifying a speed of access cluster type. The method of FIG. 9 provides more detail for step 370 of the method of FIG. 3. A speed of access for all users within a cluster is determined at step 910. The distribution of access speed is analyzed to identify a normal speed of access at step 920. The number of accesses during a period of time for each user is determined at step 930. Users are then identified that access the API outside the boundary of the normal range of access time at step 940. Hence, users associated with a super quick access time will be clustered away from a normal cluster.

Users that access the API more than a normal frequency are identified at step 950. The noncomplying access speed and/or frequency users are partitioned into sessions and remaining sessions at step 960. Hence, if a user was associated with a very fast access speed, or a very high frequency, or ace higher than usual speed and higher than usual frequency, the cluster is partitioned for the user. Metadata designed merged for the partition services at step 970. Groups with matching access speed and/or frequency are then identified at step 980. Clusters are then formed for matching access speed and/or frequency and corresponding metadata at step 990.

Figure 10:
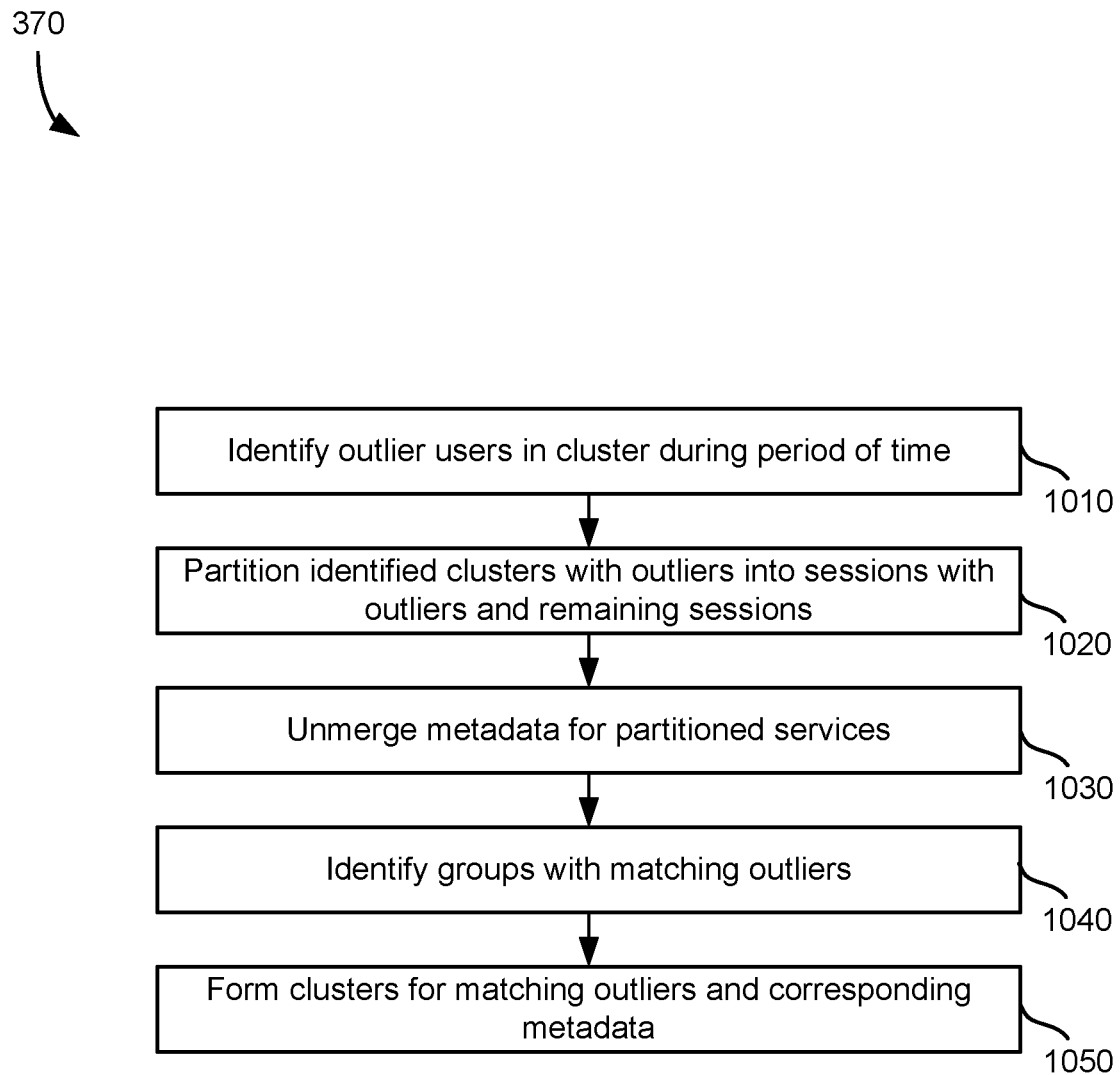
FIG. 10 is a method identifying an outlier cluster type.

FIG. 10 is a method identifying an outlier cluster type. The method of FIG. 10 provides more detail for step 370 the method of FIG. 3. Outlier users are identified in a cluster during a period of time at step 1010. The identified clusters of outliers are partitioned into sessions with outliers and the remaining sessions at step 1020. Metadata for the partition services is unmerged at step 1030. Groups with matching outliers, such as outlier behaviors, are identified at step 1040. Clusters are then formed for matching outliers, or outliers having user behaviors that are within a threshold of similarity, and their corresponding metadata at step 1050.

Figure 11:
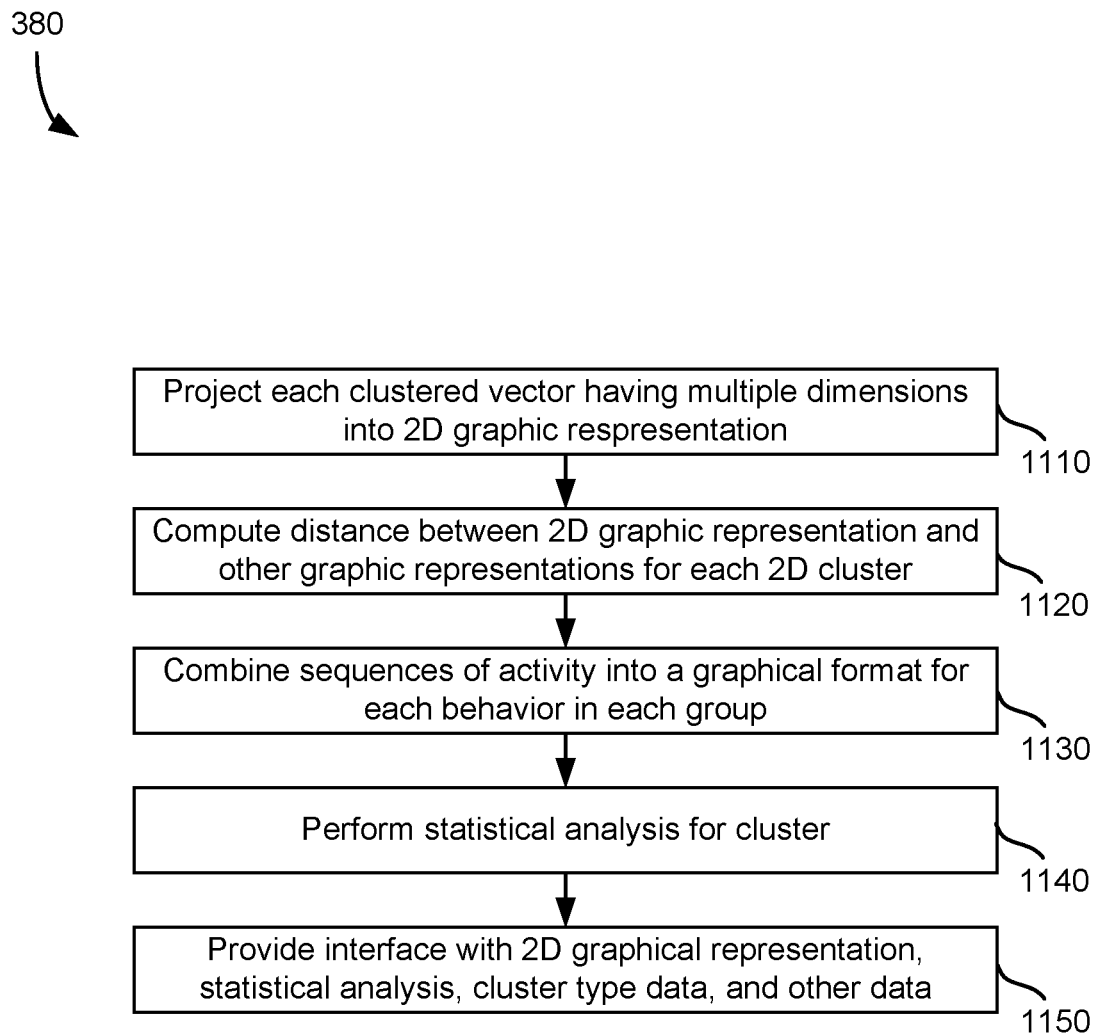
FIG. 11 is a method for reporting data through a dashboard.

FIG. 11 is a method for reporting data through a dashboard. The method of FIG. 11 provides more detail for step 380 of the method of FIG. 3. Each clustered vector having multiple dimensions is projected into a two-dimensional graphic representation at step 1110. In some instances, a t-distributed stochastic neighbor embedding (t-SNE) technique is used to transform the vectors into a two dimensional space. The distance between the two dimensional objects, such as circles, in the two dimensional space represents similarity of the groups. As such, two-dimensional circles that are closer to each other are more similar than those that are further apart.

The distance between two-dimensional graphic representations, such as circles, and other graphical representations for each two-dimensional cluster are computed at step 1120. Hence, for each circle, all the other circles are listed in order of the shortest distance away. The distance data can be stored in a data structure. Sequences of activity are then combined into a graphical format for each behavior in each group at step 1130. In some instances, each group may have more than one micro behavior in a group, and more than one individual sequence of activity. Each node is an API in each link between the nodes or APIs is a flow. A sankey diagram may be generated using nodes and flows to combine the sequences of activity into a graphical format. In a sankey diagram, the thickness of a link between nodes is proportional to the number of calls between APIs. Normal APIs can be represented in gray, while APIs that have been the target of an attack can be red, orange, yellow, or some other colored indicate the attack. By providing a graphical format, administrator can see the flow of a user sequence up until the point of attack at an API.

A statistical analysis is performed for a cluster at step 1140. The statistical analysis may be performed for a cluster for a period of time, it may include metric data and other data. More detail for performing a statistical analysis for a cluster for a period of time is discussed with respect to the method of FIG. 12. An interface with a two-dimensional graphical representation, statistical analysis data, cluster type data, and other data is reported through a dashboard at step 1150. The dashboard may list clusters of groups, show graphical representation of groups and the closest group, and other data.

Figure 12:
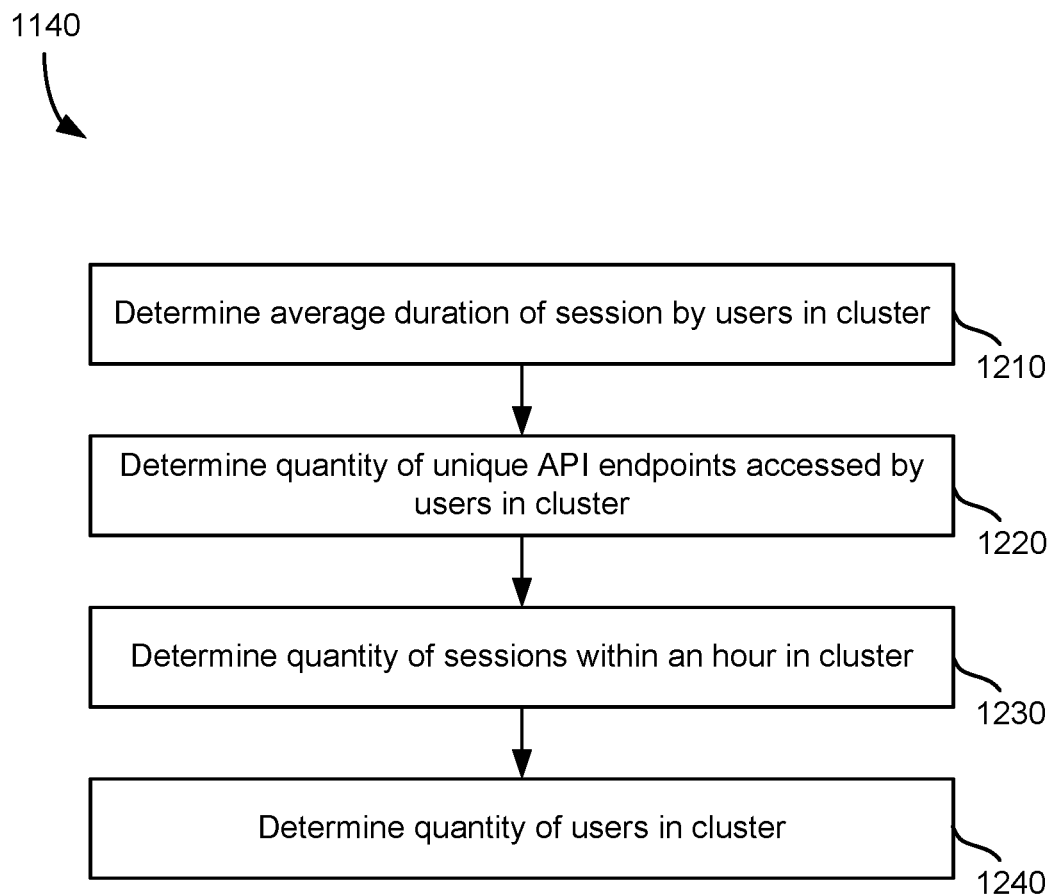
FIG. 12 is a method for performing statistical analysis on clustered user behavior data.

FIG. 12 is a method for performing statistical analysis on clustered user behavior data. The method of FIG. 12 provides more detail for step 1140 of the method of FIG. 11. The average duration of a session by users and a cluster is determined at step 1210. The quantity of unique API endpoints access by users in a cluster is determined at step 1220. The quantity of sessions within an hour within a cluster is determined at step 1230. A number of users and a cluster is then determined at step 1240.

Figure 13:
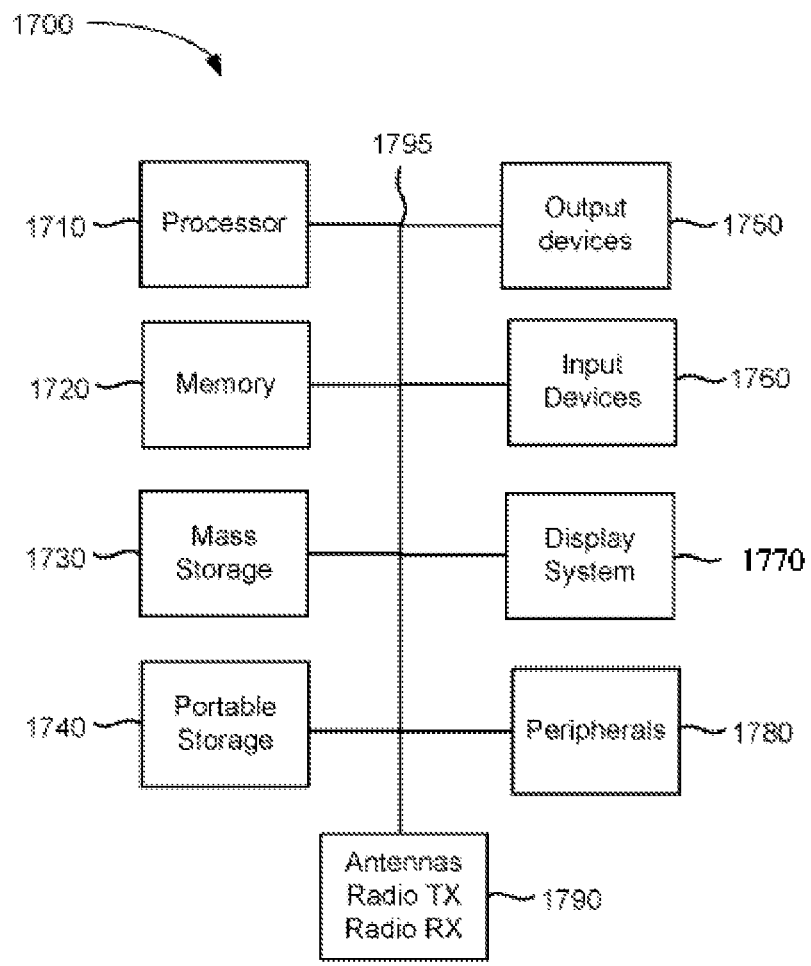
FIG. 13 is a block diagram of a system for implementing machines that implement the present technology.

FIG. 13 is a block diagram of a system for implementing machines that implement the present technology. System 1700 of FIG. 13 may be implemented in the contexts of the likes of machines that implement client devices 110-140, customer server 150, Application server 170, and data store 180. The computing system 1700 of FIG. 13 includes one or more processors 1710 and memory 1720. Main memory 1720 stores, in part, instructions and data for execution by processor 1710. Main memory 1720 can store the executable code when in operation. The system 1700 of FIG. 13 further includes a mass storage device 1730, portable storage medium drive(s) 1740, output devices 1750, user input devices 1760, a graphics display 1770, and peripheral devices 1780.

The components shown in FIG. 13 are depicted as being connected via a single bus 1790. However, the components may be connected through one or more data transport means. For example, processor unit 1710 and main memory 1720 may be connected via a local microprocessor bus, and the mass storage device 1730, peripheral device(s) 1780, portable storage device 1740, and display system 1770 may be connected via one or more input/output (I/O) buses.

Mass storage device 1730, which may be implemented with a magnetic disk drive, an optical disk drive, a flash drive, or other device, is a non-volatile storage device for storing data and instructions for use by processor unit 1710. Mass storage device 1730 can store the system software for implementing embodiments of the present invention for purposes of loading that software into main memory 1720.

Portable storage device 1740 operates in conjunction with a portable non-volatile storage medium, such as a floppy disk, compact disk or Digital video disc, USB drive, memory card or stick, or other portable or removable memory, to input and output data and code to and from the computer system 1700 of FIG. 13. The system software for implementing embodiments of the present invention may be stored on such a portable medium and input to the computer system 1700 via the portable storage device 1740.

Input devices 1760 provide a portion of a user interface. Input devices 1760 may include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 1700 as shown in FIG. 13 includes output devices 1750. Examples of suitable output devices include speakers, printers, network interfaces, and monitors.

Display system 1770 may include a liquid crystal display (LCD) or other suitable display device. Display system 1770 receives textual and graphical information and processes the information for output to the display device. Display system 1770 may also receive input as a touch-screen.

Peripherals 1780 may include any type of computer support device to add additional functionality to the computer system. For example, peripheral device(s) 1780 may include a modem or a router, printer, and other device.

The system of 1700 may also include, in some implementations, antennas, radio transmitters and radio receivers 1790. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 1700 of FIG. 13 are those typically found in computer systems that may be suitable for use with embodiments of the present invention and are intended to represent a broad category of such computer components that are well known in the art. Thus, the computer system 1700 of FIG. 13 can be a personal computer, handheld computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for automatically detecting service attackers based on application program interface (API) service business logic analysis, comprising:
   determining a total behavior as a total sequence of API activity for a plurality of users accessing a network service over a period of time;
   determining a plurality of micro-behavior strings for each user, wherein each micro-behavior includes a subset of the user's total behavior;
   converting each micro-behavior sting to a numerical vector using a minhash;
   associating each numerical vector with metadata including a session the vector occurred, IP address, and API name;
   attaching a user identifier to each numerical vector;
   clustering the numerical vector behaviors in clusters which match a similarity threshold and merge the metadata associated with each numerical vector for clustered vectors, wherein each numerical vector behavior is associated with a user ID associated with the user that performed the sequence of API activity for a particular behavior;
   determining a type of each cluster, wherein determining the type of cluster includes categorizing a cluster as associated with an attack, a bot, speed of access, and an anomaly; and
   reporting the cluster type.

2. The method of claim 1, wherein the micro-behaviors are determined with a moving window.

3. The method of claim 1, wherein the clustering includes generating a graph with distances between each numerical vector, wherein nodes are clustered together when contents of the node satisfy a threshold.

4. The method of claim 3, wherein the threshold is satisfied by a distance between neighboring nodes.

5. The method of claim 1, wherein determining a cluster as an attack or a bot includes partitioning the cluster into at least two partitions, maintaining the cluster type for at least one partitions, and identifying the remaining cluster as a normal cluster.

6. A non-transitory computer readable storage medium having embodied thereon a program, the program being executable by a processor to perform a method for automatically detecting service attackers based on application program interface (API) service business logic analysis, the method comprising:
   determining a total behavior as a total sequence of API activity for a plurality of users accessing a network service over a period of time;
   determining a plurality of micro-behavior strings for each user, wherein each micro-behavior includes a subset of the user's total behavior;
   converting each micro-behavior sting to a numerical vector using a minhash; associating each numerical vector with metadata including a session the vector occurred, IP address, and API name;
   attaching a user identifier to each numerical vector;
   clustering the numerical vector behaviors in clusters which match a similarity threshold and merge the metadata associated with each numerical vector for clustered vectors,
   wherein each numerical vector behavior is associated with a user ID associated with the user that performed the sequence of API activity for a particular behavior;
   determining a type of each cluster, wherein determining the type of cluster includes categorizing a cluster as associated with an attack, a bot, speed of access, and an anomaly; and
   reporting the cluster type.

7. The non-transitory computer readable storage medium of claim 6, wherein the micro-behaviors are determined with a moving window.

8. The non-transitory computer readable storage medium of claim 6, wherein the clustering includes generating a graph with distances between each numerical vector, wherein nodes are clustered together when contents of the node satisfy a threshold.

9. The non-transitory computer readable storage medium of claim 8, wherein the threshold is satisfied by a distance between neighboring nodes.

10. The non-transitory computer readable storage medium of claim 6, wherein determining a cluster as an attack or a bot includes partitioning the cluster into at least two partitions, maintaining the cluster type for at least one partitions, and identifying the remaining cluster as a normal cluster.

11. A system for automatically detecting service attackers based on application program interface (API) service business logic analysis, comprising:
   a server including a memory and a processor; and
   one or more modules stored in the memory and executed by the processor to determine a total behavior as a total sequence of API activity for a plurality of users accessing a network service over a period of time,
   determine a plurality of micro-behavior strings for each user, wherein each micro-behavior includes a subset of the user's total behavior,
   convert each micro-behavior sting to a numerical vector using a minhash,
   associate each numerical vector with metadata including a session the vector occurred, IP address, and API name, attaching a user identifier to each numerical vector,
   cluster the numerical vector behaviors in clusters which match a similarity threshold and merge the metadata associated with each numerical vector for clustered vectors,
   wherein each numerical vector behavior is associated with a user ID associated with the user that performed the sequence of API activity for a particular behavior,
   determine a type of each cluster, wherein determining the type of cluster includes categorizing a cluster as associated with an attack, a bot, speed of access, and an anomaly, and report the cluster type.

* * * * *